(12) United States Patent
Smith et al.

(10) Patent No.: US 6,428,759 B1
(45) Date of Patent: Aug. 6, 2002

(54) PRODUCTION OF FEED LIQUORS FOR SODIUM CARBONATE CRYSTALLIZATION PROCESSES

(75) Inventors: David E. Smith, Princeton, NJ (US); William C. Copenhafer, Yardley, PA (US); Richard W. Chastain, Lyman, WY (US)

(73) Assignee: FMC Wyoming Corporation, Philadelphia, PA (US)

( * ) Notice: Subject to any disclaimer, the term of this patent is extended or adjusted under 35 U.S.C. 154(b) by 0 days.

(21) Appl. No.: 09/563,485

(22) Filed: May 2, 2000

(51) Int. Cl.[7] .............................. C01D 7/00; C22B 26/00
(52) U.S. Cl. .................................. 423/206.2; 423/421
(58) Field of Search .......................... 423/206.2, 421, 423/426

(56) References Cited

U.S. PATENT DOCUMENTS

| | | | |
|---|---|---|---|
| 2,388,009 A | | 10/1945 | Pike |
| 2,625,384 A | | 1/1953 | Pike et al. |
| 2,770,524 A | * | 11/1956 | Seaton et al. |
| 2,887,360 A | * | 5/1959 | Hoekje |
| 3,050,290 A | | 8/1962 | Caldwell et al. |
| 3,119,655 A | | 1/1964 | Frint et al. |
| 3,131,996 A | * | 5/1964 | Seglin et al. |
| 3,184,287 A | | 5/1965 | Gancy |
| 3,246,962 A | | 4/1966 | Miller |
| 3,260,567 A | * | 7/1966 | Hellmers et al. |
| 3,264,057 A | | 8/1966 | Miller |
| 3,425,795 A | * | 2/1969 | Howard et al. |
| 3,479,133 A | * | 11/1969 | Warzel |
| 3,479,134 A | * | 11/1969 | Warzel |
| 3,498,744 A | * | 3/1970 | Frint et al. |
| 3,869,538 A | | 3/1975 | Sproul et al. |
| 3,953,073 A | | 4/1976 | Kube |
| 4,869,882 A | | 9/1989 | Dome et al. |
| 5,043,149 A | | 8/1991 | Frint et al. |
| 5,262,134 A | | 11/1993 | Frint et al. |
| 5,283,054 A | | 2/1994 | Copenhafer et al. |
| 5,575,922 A | | 11/1996 | Green et al. |
| 5,609,838 A | | 3/1997 | Neuman et al. |
| 5,736,113 A | * | 4/1998 | Hazen et al. |
| 5,759,507 A | * | 6/1998 | Delling et al. |
| 5,766,270 A | | 6/1998 | Neuman et al. |
| 5,911,959 A | * | 6/1999 | Wold et al. |
| 5,955,043 A | | 9/1999 | Neuman et al. |
| 5,989,505 A | | 11/1999 | Zolotoochin et al. |

* cited by examiner

Primary Examiner—Steven Bos
(74) Attorney, Agent, or Firm—TraskBritt

(57) ABSTRACT

A process is disclosed for converting dilute brines of sodium carbonate and sodium bicarbonate to form feed solutions from which sodium based chemicals may be recovered. The sodium bicarbonate in a dilute brine is neutralized and the brine then fortified with calcined trona to form a feed liquor concentrated in sodium carbonate from which sodium based chemicals may be recovered in a Monohydrate or other crystallization process.

25 Claims, 3 Drawing Sheets

PRODUCTION OF FEED LIQUORS FOR SODIUM CARBONATE CRYSTALLIZATION PROCESSES

BACKGROUND OF THE INVENTION

1. Field of the Invention

The invention generally relates to a process for recovering sodium chemicals, including sodium carbonate and/or sodium monohydrate from trona ore formations. More specifically, the invention relates to an improved process for the recovery of sodium based chemicals from sodium containing ore which may be incorporated with traditional monohydrate, solution mining or other sodium extraction processes.

2. State of the Art

In southwestern Wyoming, in the vicinity of Green River, a vast deposit of crude, mineral trona ($Na_2CO_3 \cdot NaHCO_3 \cdot 2H_2O$) which lies some 800 to 3,000 feet beneath the surface of the earth has been discovered. Other such underground deposits of trona have also been discovered in Turkey and China. The Green River trona beds cover 1,000 square miles and consist of several different beds which generally overlap each other and are separated by layers of shale. In some areas, the trona beds occur over a 400 foot stratum with ten or more layers comprising 25% of the total stratum. Several soda ash companies at Green River dry mine a trona seam about 12 feet in thickness at approximately 1,500 feet below the surface, the seam containing about 90% trona. The quality of the trona varies greatly depending on its location in the stratum. A typical analysis of the crude trona being mined at Green River, Wyo., is as follows:

| Constituent | Percent |
| --- | --- |
| Sodium Sesquicarbonate | 90.00 |
| NaCl | 0.1 |
| $Na_2SO_4$ | 0.02 |
| Organic Matter | 0.3 |
| Insolubles | 9.58 |
| | 100.00 |

Trona ore is conventionally dry mined by sinking shafts and utilizing miners and machinery to recover the ore from seams below the surface. The underground mining techniques used to recover trona ore vary, including room and pillar mining, continuous mining, long wall mining and other techniques well known in trona mining. Each of these techniques have been employed to improve mining efficiency. However, the cost of dry mining trona ore remains a factor in the production of sodium chemicals, the largest expense resulting from the use of equipment and human labor to recover the trona deposits.

Crude trona ore is processed to convert it into desirable forms such as sodium carbonate ($Na_2CO_3$), sodium bicarbonate ($NaHCO_3$), caustic soda (NaOH), sodium sesquicarbonate ($Na_2CO_3 \cdot NaHCO_3 \cdot 2H_2O$), sodium phosphate ($Na_5P_3O_{10}$), or other sodium containing chemicals. One of the most marketable sodium compounds is soda ash, also known as sodium carbonate. Typically, one of two well known processes is used to recover sodium carbonate from trona ore: the Sesquicarbonate process or the Monohydrate process.

The Sesquicarbonate process involves a series of steps, including: dissolving the crude mined trona in a cycling, hot mother liquor containing excess normal sodium carbonate over sodium bicarbonate in order to dissolve the trona congruently, clarifying the insoluble muds from the solution, filtering the solution, passing the filtrate to a series of vacuum crystallizers where water is evaporated and the solution is cooled causing sodium sesquicarbonate to crystallize out of the solution in a stable crystal phase, recycling the mother liquor to dissolve more crude trona and calcining the sesquicarbonate crystals at a temperature sufficient to convert same to sodium carbonate, or soda ash.

A more direct and simplified method developed subsequently to the Sesquicarbonate process is the Monohydrate process. The Monohydrate process tends to yield a dense, organic-free sodium carbonate product through a series of steps which include: calcining the crude trona ore at a temperature of about 125 degrees C. to about 500 degrees C. to convert the trona ore to crude sodium carbonate and to reduce the amount of the organics by oxidation and distillation, dissolving the crude sodium carbonate in water, clarifying the resulting sodium carbonate solution to remove insolubles as muds therefrom, filtering the clarified solution, evaporating water from the clarified and filtered sodium carbonate solution in an evaporator circuit, crystallizing sodium monohydrate crystals from the pregnant mother liquor, calcining the monohydrate crystals to produce a dense, organic-free sodium carbonate product and recycling the mother liquor from the crystals to the evaporation step. The dense soda ash product produced by the Monohydrate process has become the standard product of the trona based sodium carbonate/soda ash industry.

Solution mining has become of more interest as costs associated with dry mining have increased. Furthermore, solution mining offers a process by which the large quantities of ore remaining as pillars, walls, and ceilings in previously dry mined areas may be recovered. In its simplest form, solution mining involves dissolving trona ore into a solution and recovering sodium products from the solution. For example, a trona ore deposit, or other sodium-containing ore, is contacted with a solvent, such as water. The water dissolves the trona ore creating a brine. The brine is recovered and processed to recover sodium carbonate, sodium bicarbonate, sodium sesquicarbonate, sodium monohydrate, or other sodium products. The sodium depleted brine is typically recycled to the trona ore deposit to dissolve additional trona.

One of the downfalls of solution mining, however, is the relatively slow in situ dissolution rate of sodium carbonate and sodium bicarbonate into solution from the trona ore deposits. Typically, solutions formed by the solution mining processes have low concentrations of sodium carbonate and sodium bicarbonate and are therefore lacking the concentrations required to pass the solutions directly into a Monohydrate process or Sesquicarbonate process. Furthermore, solutions recovered from solution mining often vary in concentrations of sodium carbonate and sodium bicarbonate which forces changes in the processing steps and wreaks havoc with process consistency.

BRIEF SUMMARY OF THE INVENTION

The present invention provides a novel process for converting mine water or brines having concentrations of sodium carbonate and/or sodium bicarbonate into sodium containing constituents such as sodium carbonate, sodium bicarbonate, sodium sesquicarbonate, sodium monohydrate, sodium carbonate decahydrate, and the like.

The process involves the neutralization and fortification of brine or mine solutions having sodium carbonate and sodium bicarbonate concentrations. Neutralization, as the term is used herein, is the conversion of a portion of the sodium bicarbonate concentration within the brine or mine solution to sodium carbonate. In the instant process, a brine having concentrations of sodium bicarbonate is neutralized. The neutralized brine is then fortified to increase the concentration of sodium carbonate in the brine or mine solution. Fortification is achieved using calcined trona. The neutralized and fortified brine is suitable for processing or may be added as a supplement to a conventional Monohydrate or other crystallization process.

One example of the process is the recovery of a brine from an underground trona mine. A solvent, such as water, is pumped into an underground trona mine wherein the water dissolves the trona ore. In addition to the water pumped into the trona mine, naturally occurring groundwater may mix with the introduced water. Over time, the water dissolves sodium carbonate and sodium bicarbonate from the trona deposit to form a brine. The brine is pumped from the mine to a processing plant where it is neutralized. Neutralization is usually effected using lime or another caustic which converts at least a portion of the sodium bicarbonate within the brine to sodium carbonate. All of the brine taken from a mine may be treated, or optionally, the brine stream may be split into two streams wherein one stream is neutralized before being re-combined with the second stream to form a neutralized brine stream. In addition to neutralization, the brine stream may be stripped to further convert the sodium bicarbonate to sodium carbonate.

The neutralized brine stream is fortified with calcined trona to increase the total alkalinity of the brine solution. The calcined trona fortification material increases the total alkalinity of the brine by increasing the sodium carbonate concentration without significantly increasing the sodium bicarbonate concentration in the brine. The neutralized and fortified brine is added to a crystallizer where crystals, such as sodium carbonate, sodium monohydrate, and sodium carbonate decahydrate, may be precipitated from the neutralized and fortified brine solution using traditional Monohydrate or other crystallization processes.

BRIEF DESCRIPTION OF THE DRAWINGS

While the specification concludes with claims particularly pointing out and distinctly claiming that which is regarded as the present invention, the advantages of this invention can be more readily ascertained from the following description of the invention when read in conjunction with the accompanying drawings in which:

DESCRIPTION OF THE ILLUSTRATED EMBODIMENTS

The present process is advantageous because it provides an economical process by which dilute brines obtained from using low temperature water as a solution mining solvent may be processed in existing Monohydrate processes. Unlike traditional Monohydrate processes, the present inventive process is also able to accommodate brines which are nonuniform, such as those obtained from solution mining processes in which low temperature water is used to dissolve trona ore, and which vary in their sodium bicarbonate to sodium carbonate ratios and contents because of the incongruent dissolution phenomena of trona ore in solution mines. The present process may also be used with sodium bicarbonate containing ore deposits other than trona.

The present invention involves the neutralization and fortification of a brine from which sodium carbonate or sodium carbonate monohydrate crystals may be precipitated using traditional Monohydrate or other crystallization processes. A brine obtained from traditional solution mining processes, or from waste streams or evaporation ponds, having concentrations of sodium carbonate and sodium bicarbonate is first neutralized with a caustic, such as lime. Neutralization of the brine converts sodium bicarbonate to sodium carbonate. The brine may also be stripped before or after neutralization to further convert sodium bicarbonate concentrations to sodium carbonate concentrations. Following neutralization, the brine is fortified with calcined trona to increase the total alkalinity within the brine and form a brine which will precipitate sodium carbonate or sodium carbonate monohydrate in a crystallization process, for example, in a Monohydrate process.

When trona ore is solution mined with water, the trona is incongruently dissolved. When crude trona is dissolved in water, sodium sesquicarbonate (which constitutes about 90% of the trona ore) cannot be crystallized from the solution by cooling. This is readily seen by inspecting the line YZ in FIG. 1, the so-called trona/water line which defines the concentrations of sodium bicarbonate and sodium carbonate in solution obtained when dissolving trona (sodium sesquicarbonate) in water, the actual composition of which is dependent on temperature. The graph shows three solubility isotherms one at 100 degrees C., one at 30 degrees C. and one at 20 degrees C.

Figure 1:
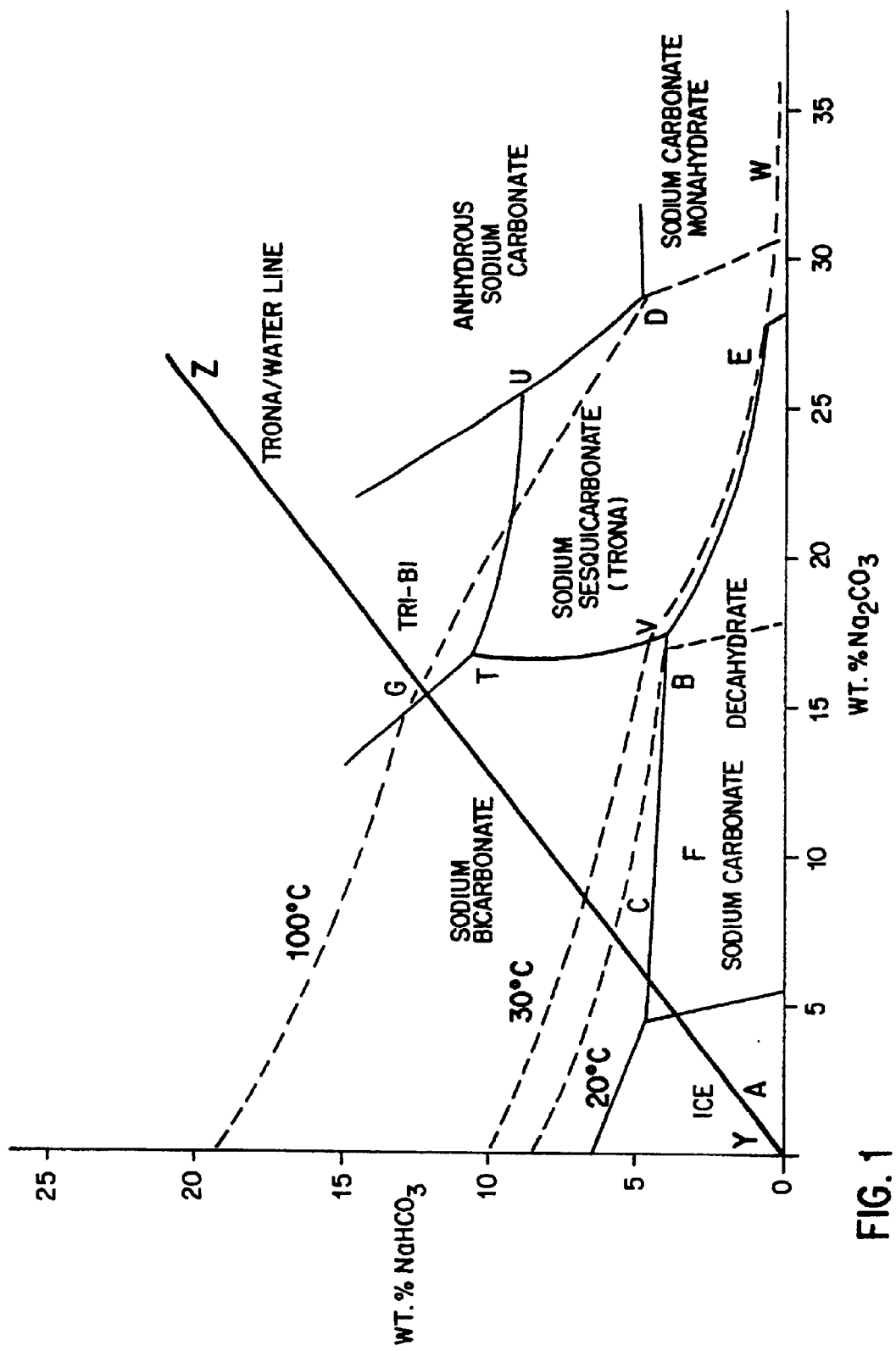
FIG. 1 is a phase diagram for water, sodium carbonate, and sodium bicarbonate.
Figure 2:
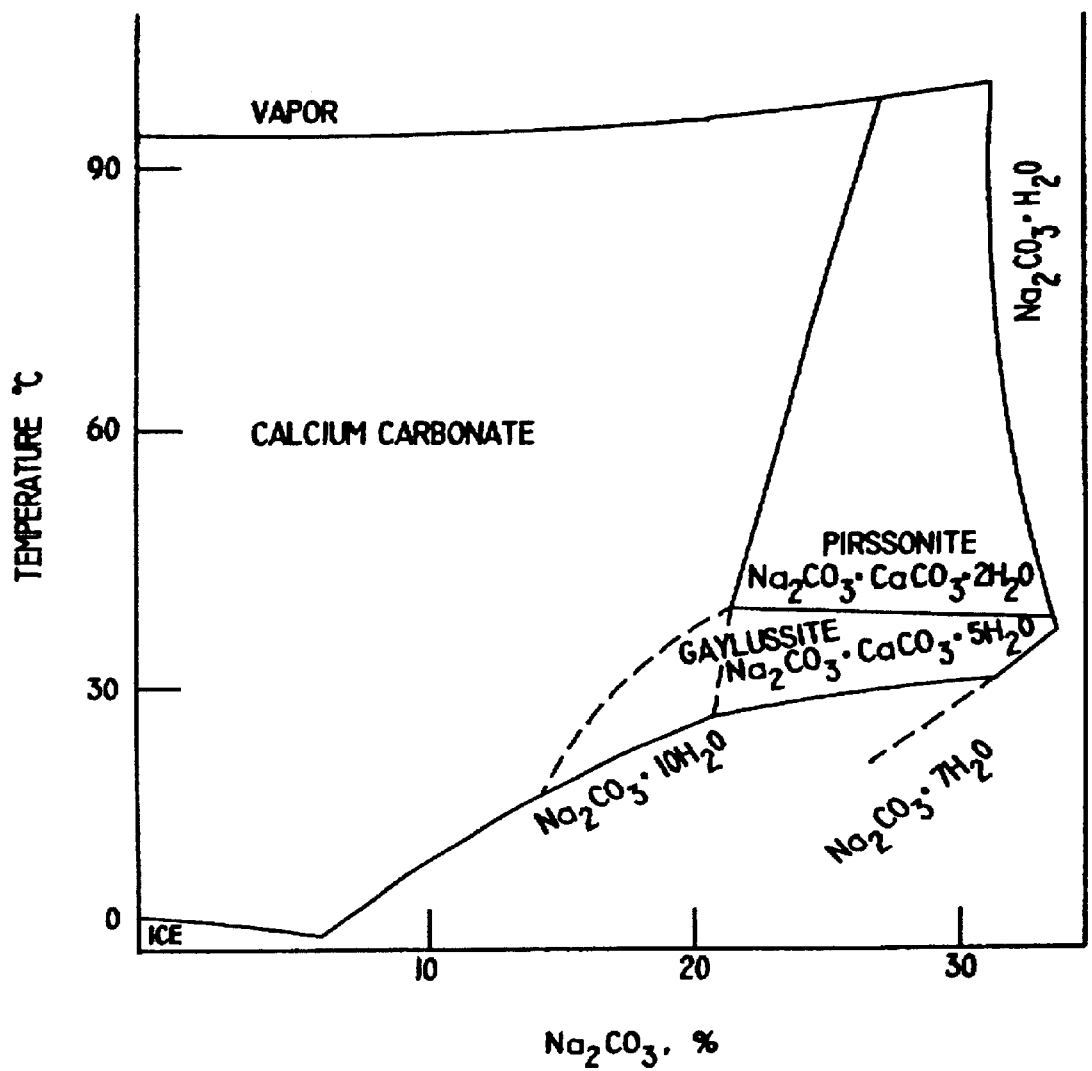
FIG. 2 is a graph of a phase relationship for the sodium ion/calcium ion/carbon dioxide/water system for various sodium carbonate concentrations and temperatures.

FIG. 1 is an overall graph of the phase relationship between water, sodium bicarbonate and sodium carbonate, including the three isotherms reviewed above, which define the solid salts obtained by crystallizing solutions of varying concentrations of sodium carbonate and sodium bicarbonate. As will be seen by observing line YZ, it never intersects the sodium sesquicarbonate boundaries defined by points T-U-W and V which is the area where sodium sesquicarbonate crystals are in equilibrium with such solutions. It is only within this area that sodium sesquicarbonate can be crystallized from solutions containing the concentrations of sodium carbonate and sodium bicarbonate illustrated. Accordingly, since no point on the line defining the trona in water solution falls within the sodium sesquicarbonate region, it is apparent that sodium sesquicarbonate cannot be dissolved in water and crystallized back out when the solution is cooled.

Solution mining of trona at 20 degrees C. with a water solvent results in dissolving the trona along the YZ line set forth in FIG. 1 until the solution reaches saturation with respect to the bicarbonate at the 20 degrees C. solubility isotherm. At that point, continued contact of the solvent with additional trona results in the solution moving to the right along the solubility isotherm resulting in sodium bicarbonate precipitating out and additional sodium carbonate dissolving until an equilibrium is reached with the trona at about 17% sodium carbonate and about 4% sodium bicarbonate. If the water solvent is about 30 degrees C., the process is the same except the 30 degree C. solubility isotherm is used and the final composition is very similar, at about 17.3% sodium carbonate and about 4.7% sodium bicarbonate. At these temperatures, small increases in solvent do not significantly change the equilibrium composition. Therefore, it is uneconomical to raise the temperature of the solvent above the normal temperature of the trona formation which is about 20 degrees C. to 22 degrees C. at about 1,500 feet below ground surface.

As the trona is incongruently dissolved in the water solvent and reaches equilibrium, a layer of sodium bicarbonate is formed on the surface of the trona face being dissolved. This sodium bicarbonate layer impedes further dissolution of trona, but does not stop it because the sodium bicarbonate is also soluble in water. Using ground temperature water as a solvent results in an exit brine concentration which changes with time because more bicarbonate dissolves into solution and less trona dissolves into solution as time progresses. Ultimately, the brine becomes reduced in strength depending upon the relative amounts of water used to dissolve the trona. When large amounts of trona are present and the amount of water solvent is limited, the trona-water combination approaches equilibrium and the resulting brine equilibrium remains at about 17% sodium carbonate and about 4% sodium bicarbonate. Such conditions exist when the area being solution mined by the water solvent contains a vast quantity of trona with large amounts of exposed surface area. Over time the exit brine has difficulty reaching an equilibrium as the trona dissolution decreases. When this occurs, the exit brine composition moves to the left on FIG. 1 with the bicarbonate concentration increasing and the carbonate concentration decreasing. This is known as blinding. Although blinding may not occur for many years, any process which uses brine resulting from solution mining as a feed stock should be able to handle the time-related changes in feed liquor composition without requiring major process or equipment changes.

A source of feed brine for the process of the present invention can be generated by solution mining trona ore using water or an aqueous solution containing small amounts of sodium carbonate or sodium bicarbonate as the solvent. An ideal solvent is a water solution containing less than about 3% sodium carbonate and/or less than 3% sodium bicarbonate such as represented by the region designated A on the phase diagram of FIG. 1. The temperature of the solvent is preferably maintained at about the temperature of the trona formation being solution mined, or at about 20 degrees C. to 22 degrees C. (at a depth of about 1,500 feet below the surface). Actual experience has shown that solution mining at ground temperature using water or a dilute water solution will result in a brine with a composition in the vicinity of region B shown in FIG. 1. Such brine is normally about 4% by weight sodium bicarbonate and about 13% to about 16% by weight sodium carbonate, the exact concentrations varying with impurity concentration and the residence time of the solvent against a trona ore body.

Another source of feed brine for the present process occurs naturally within most mines. Naturally occurring mine water from the inflow of ground water into the mine mixes with the solution mining solvent and contributes to the overall concentration of the solution mine brine. Generally the water flowing into the mine from aquifers or trapped water in trona formations passes through trona beds and dissolves some trona. This naturally occurring mine water can vary widely in composition ranging from a few percent total alkali (TA) to saturation (about 20% TA).

Other sources for suitable brine solutions also include waste streams from sodium carbonate recovery processes such as typical Monohydrate and Sesquicarbonate processes. Furthermore, brine from evaporation ponds may be suitable for use as a brine in the present process if the sodium carbonate and sodium bicarbonate concentrations in the brine fall within the ranges described in this invention.

The term "TA" or "total alkali" as used herein refers to the weight percent in solution of sodium carbonate and/or sodium bicarbonate (which latter is conventionally expressed in terms of its equivalent sodium carbonate content). For example, a solution containing 17 weight percent $Na_2CO_3$ and 4 weight percent $NaHCO_3$ would have a TA of 19.5%.

The present inventive process may be applied to any bicarbonate/carbonate brine, and preferably a recovered brine having a total alkali value of at least about 3% by weight, and more preferably about 8% by weight. Handling brines which are more dilute than this becomes economically unattractive. Unlike other solution mining processes, the concentration of sodium carbonate and sodium bicarbonate in the brine and the ratio of the bicarbonate to carbonate salt is not critical in the present inventive process because the present process is capable of handling various brine concentrations without any material changes in the processing steps or processing conditions.

The instant process provides a novel means of economically using mine water or other sodium carbonate and sodium bicarbonate containing brines to produce soda ash. Whereas some of the previously disclosed processes involve contacting solution mining brines with uncalcined dry mined trona to increase the TA concentration of the brine, the instant process first neutralizes the sodium bicarbonate in the brine and then uses calcined trona to increase the sodium carbonate content of the brine. Thus, the instant process directly produces a concentrated sodium carbonate solution suitable as feed to a sodium carbonate monohydrate evaporator-crystallizer in a Monohydrate process. By using calcined trona instead of uncalcined trona to fortify the brine, additional sodium bicarbonate is not added to the liquor resulting in smaller quantities of sodium bicarbonate which must be steam stripped and/or neutralized. The instant process also eliminates the need for other costly techniques described in the literature to increase the TA content of an alkali brine, such as evaporation and/or sodium carbonate decahydrate crystallization. An existing Monohydrate process plant can be easily retrofitted to incorporate the instant process thereby providing a simple and inexpensive way to recover TA values in sodium bicarbonate and sodium carbonate containing brines as soda ash product which were heretofore extremely expensive to recover.

The first step of the process involves the heating of a feed brine, and if desired the stripping of the feed brine. The feed brine is heated to a temperature between about 100 degrees C. to about 140 degrees C., and preferably to about 105 degrees C. to about 120 degrees C. The heated feed brine may be stripped with steam in a column to decompose some of the sodium bicarbonate into sodium carbonate, carbon dioxide and water. Steam stripping may occur by any well known methods in the art. Steam stripping is preferably accomplished in a countercurrent flow column containing random or structural packing or in a tray type column. Heated feed brine enters the top of the column and stripped brine leaves the bottom of the column. Steam in introduced into the bottom of the column, and water vapor and carbon dioxide exit the top of the column. Loss of carbon dioxide from the solution results from decomposing the sodium bicarbonate to sodium carbonate according to the following chemical reaction:

$$2NaHCO_3 \rightarrow Na_2CO_3 + H_2O + CO_2$$

The preheated feed brine exiting the stripper remains at about the same brine TA concentration as the brine entering the stripper because water evolved from the stripper is essentially balanced by steam being fed into the stripper from the evaporator. The carbon dioxide gas leaving the steam stripping column may be recovered and used to make other products, such as sodium bicarbonate.

If necessary, the feed brine may be clarified or filtered before being introduced to the stripper to remove any insoluble material that might be present. Also, the brine may undergo treatment to remove organic impurities prior to stripping by any of the well known methods in the art.

Following steam stripping, the brine is neutralized to convert additional sodium bicarbonate to sodium carbonate. The term "neutralization" or "neutralization stage" represents the conversion of sodium bicarbonate to sodium carbonate by reaction with lime and/or sodium hydroxide. Sufficient caustic soda or lime is added to the brine to produce a final brine which will contain either about 0% to 2% by weight sodium bicarbonate or about 0% to 1% by weight sodium hydroxide, and more preferably either about 0% to 0.5% by weight sodium bicarbonate or about 0% to 0.5% by weight sodium hydroxide in the feed solution. Hence, the final brine passed along to a monohydrate evaporator circuit may contain a slight excess of sodium hydroxide.

In the alternative, the brine leaving the steam stripping stage of the process, or a feed brine if stripping is not used, may be split into two streams. One stream may be sent to a lime causticization unit to make dilute caustic soda, for example about 1% up to 12% by weight sodium hydroxide, which is then reacted with the remaining split brine stream to neutralize the sodium bicarbonate in the brine streams. By adding lime to only part of the brine, the size of the lime slaker and causticization equipment is reduced without reducing the amount of lime causticization. Grits (unreactive material in the lime) may be separated and removed from the dilute caustic in the lime slaker as known in the art.

Optionally the dilute caustic or the entire neutralized brine stream may be clarified and/or filtered to remove insoluble materials from the slaking/causticization operation including grits, unreacted lime and calcium carbonate, collectively referred to as "lime muds."

If a separate, parallel lime causticization step is carried out to make caustic soda, then the preferred source of feed to the causticizing unit is the stripped brine that has had some of its bicarbonate values decomposed but which remains at about the same TA concentrations as the brine fed to the stripper. The stripped brine is a preferred feed because it requires less lime to causticize it than the original brine feed containing more bicarbonate values. However, the instant invention may use caustic soda from any source.

The overall, simplified reactions taking place in the causticizing unit are as follows:

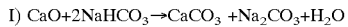

I) $CaO + 2NaHCO_3 \rightarrow CaCO_3 + Na_2CO_3 + H_2O$

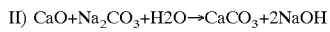

II) $CaO + Na_2CO_3 + H_2O \rightarrow CaCO_3 + 2NaOH$

As is clear from reaction II above, one mole of lime (CaO) will react with each mole of sodium carbonate in the brine stream fed to the causticizing unit to produce two moles of sodium hydroxide. However, since sodium bicarbonate also requires lime to convert it into sodium carbonate, as shown in reaction I) above before it can be reacted to form sodium hydroxide via reaction II, lower bicarbonate concentrations in the brine fed to the causticization unit means less lime usage in converting the total alkali into sodium hydroxide. Since the stripped brine from the stripper contains lower bicarbonate values than the brine feed, it becomes the preferred causticizer feed because it requires less lime to convert it into sodium hydroxide than the original brine feed. Causticization is carried out at elevated temperatures of about 70 degrees C. to about 100 degrees C. This allows better utilization of lime since the causticization reaction is more efficiently carried out at such elevated temperatures and promotes better settling of the muds. Additionally, the reaction is exothermic and facilitates maintaining the solutions at elevated temperatures. The final aqueous caustic solution is also recovered hot and is a dilute solution of sodium hydroxide having a concentration of about 1 up to about 12 weight percent NaOH.

Following neutralization, the brine may be filtered or clarified to remove unreacted lime and other insoluble materials from the brine. If lime muds exist, it is preferred that the lime muds are removed from the solution in order to prevent precipitation of pirssonite which occurs when hot, concentrated liquor containing more than about 20 percent by weight TA liquor contacts the lime muds. Such a precipitation is undesirable because as pirssonite precipitates, the concentration of sodium carbonate within solution drops.

The neutralized brine from the causticization step is introduced into a calcined trona dissolving/tailings separation circuit to increase the sodium carbonate content of the brine to a high enough level to be subsequently fed to a sodium carbonate monohydrate evaporator-crystallizer. The brine is fortified with calcined trona which has been dry mined and calcined using methods well known in the art. In the calcined trona dissolving/tailings separation circuit, sufficient calcined trona is added to the neutralized brine to increase the sodium carbonate content of the brine-containing liquor to at least 22% by weight, and more preferably to about 28% by weight, and most preferably to about 30% by weight. As the trona is dissolved in the brine, the sodium carbonate concentration in the brine increases, forming a brine suitable for processing by a Monohydrate process.

The leach section in the calcined trona dissolving/tailings separation circuit consists of one or more trona dissolving or leach tanks in series, each of which is agitated and operated at temperatures of about 80 degrees C. up to the atmospheric boiling point of the solution, about 100 degrees C. This temperature may vary with altitude. Tailings are separated from the concentrated liquor leaving the leach tanks using spiral classifiers or hydrocyclones. The concentrated liquor containing mainly fine tailings then goes to a clarifier to settle the bulk of the remaining insoluble material. Any overflow from the clarifier is filtered to remove suspended solids, and, if necessary, carbon treated to reduce the amount of organic material present. The filtered liquor is then sent to a sodium carbonate monohydrate evaporator-crystallizer. The underflow from the clarifier, containing finely sized tailings, goes to a thickener to recover TA values present in the liquor portion of the clarifier underflow slurry.

The neutralized brine can be added to the thickener, and the overflow from the thickener is preferably sent to the leach tanks to dissolve the calcined trona. Another stage of thickening is preferably used to further enhance TA recovery, i.e. the underflow from the first thickener goes to a second thickener. Water or dilute alkali liquor, preferably containing less than about 2% sodium bicarbonate, is added to the second thickener, and the overflow liquor from the second thickener goes to the first thickener along with the neutralized brine and the clarifier underflow streams. The objective in the calcined trona dissolving/tailings separation circuit is to obtain a clarifier overflow liquor concentration of about 22% to about 30% by weight sodium carbonate and to minimize the loss of TA values in the tailings that leave the final thickener. Depending on the concentration of the neutralized brine and the amount of neutralized brine available, water or dilute alkali from another source may have to be added to the calcined trona dissolving/tailings separation circuit to keep the clarifier overflow within the preferred range of about 22% to about 30% by weight sodium carbonate.

If the liquor in the first thickener in the calcined trona dissolving/tailings separation circuit is less than about 20% TA by weight after adding neutralized brine to the first thickener, then it is preferred that the lime mud from the neutralized brine in the lime causticization circuit is not separated from the brine. The lime muds can then enter the first thickener along with neutralized liquor without risk of pirssonite precipitation. The lime muds will leave the first thickener in the underflow with the calcined trona tailings. The tailings from the final thickener can be disposed of by returning the material to the underground mine or by placing the material in an impoundment or landfill on the surface.

Alternatively, the neutralized brine, with or without lime muds, could be added to only the second thickener. Also, a third stage of thickening can be added to increase TA recovery.

In the next step of the instant process, the 22–30% sodium carbonate filtered solution is evaporated at temperatures above about 60 degrees C. and below about 110 degrees C. to form sodium carbonate monohydrate crystals. This operation is carried out by means of suitable multiple-effect evaporators or more preferably by a vapor recompression evaporator which allows evaporation of the solution and crystallization of the sodium carbonate monohydrate. In a multiple-effect evaporator, the liquor temperature varies from effect to effect with much of the evaporation taking place at temperatures below 100 degrees C. Although some thermal decomposition of sodium bicarbonate can occur in a multiple-effect evaporator, it is minimal below 100 degrees C. In a multiple-effect evaporator, sodium bicarbonate levels in the feed above about 0.5% can result in co-crystallization of sodium sesquicarbonate along with sodium carbonate monohydrate depending on operating conditions. By contrast, all of the liquor in a mechanical vapor recompression monohydrate evaporator is generally subjected to temperatures above 100 degrees C., and more decomposition of sodium bicarbonate occurs. When the feed to the evaporator contains more than about 1% sodium bicarbonate, provisions should be made in the evaporator equipment design to allow venting of carbon dioxide gas resulting from decomposition of sodium bicarbonate. The monohydrate crystal slurry is removed from the monohydrate evaporator crystallizer and sent to a centrifuge where the crystals are separated from their mother liquor. The mother liquor is returned to the monohydrate evaporator crystallizer while the crystals are sent to a dryer and heated until converted into soda ash. Some of the mother liquor being returned from the centrifuge to the monohydrate evaporator crystallizer may be subject to purge from the process to control impurity levels. Optionally, the monohydrate mother liquor purge can be sent to a sodium decahydrate crystallizer where the solution is cooled down to about 0 degrees C. to about 30 degrees C., with about 5 degrees C. to about 20 degrees C. being preferred. This permits recovery of some of the sodium carbonate values in the monohydrate mother liquor purge stream as decahydrate crystals and because the purge stream of mother liquor from the sodium decahydrate crystallizer is more concentrated in impurities, less sodium carbonate values are purged from the process. The sodium carbonate decahydrate crystals so recovered can be melted by adding a small amount of water and heating above 30 degrees C. to yield a relatively pure solution of about 30% by weight sodium carbonate which can be recycled back to the monohydrate evaporator feed. Alternately, the deca crystals can be melted in the fresh evaporator feed stream if the feed isn't saturated. As another alternative, the solution formed by melting the crystals can be carbonated to form sodium bicarbonate or sodium sesquicarbonate crystals which can be separated and recovered as a product.

Although the preferred process is to steam strip the brine at about 100 degrees C. or higher, the steam stripping step may be eliminated and the sodium bicarbonate in the brine reduced only by means of adding lime or sodium hydroxide to the fresh brine. Depending on the ratio of bicarbonate to carbonate in the feed brine and the cost of steam, lime and/or sodium hydroxide, it may be more cost effective to use only lime and/or caustic soda to remove the sodium bicarbonate than to employ steam stripping.

The present process has major advantages over those presently used in the art. Among these advantages are the following:

a. The instant process can utilize as the feed, solution mined trona, where the in situ mining has been carried out using ambient temperature water as the solvent notwithstanding the fact these solutions do not contain the high concentrations of total alkali normally required and employed in the Sesquicarbonate process and in the Monohydrate process. A low temperature aqueous solvent is of course most desirable because it minimizes energy requirements for solution mining.

b. The alkali values from the solution mined trona can be converted into a variety of products namely a 30% by weight sodium carbonate solution, sodium carbonate monohydrate crystals and finally dense soda ash. The monohydrate crystals and the final soda ash product have each separate applications and advantages as final saleable products while the sodium carbonate solution is useful as a raw material when making other sodium-based chemicals such as sodium phosphate and sodium bicarbonate.

c. The instant process permits recovery of what is currently considered waste streams, which do not have enough alkali values for processing by conventional Monohydrate technology. These waste streams can be used as the solvent in the solution mining step to take on additional alkali values and can be employed as the feed brine to the instant process.

d. The instant process can be easily incorporated into an existing Monohydrate Process plant.

Figure 3:
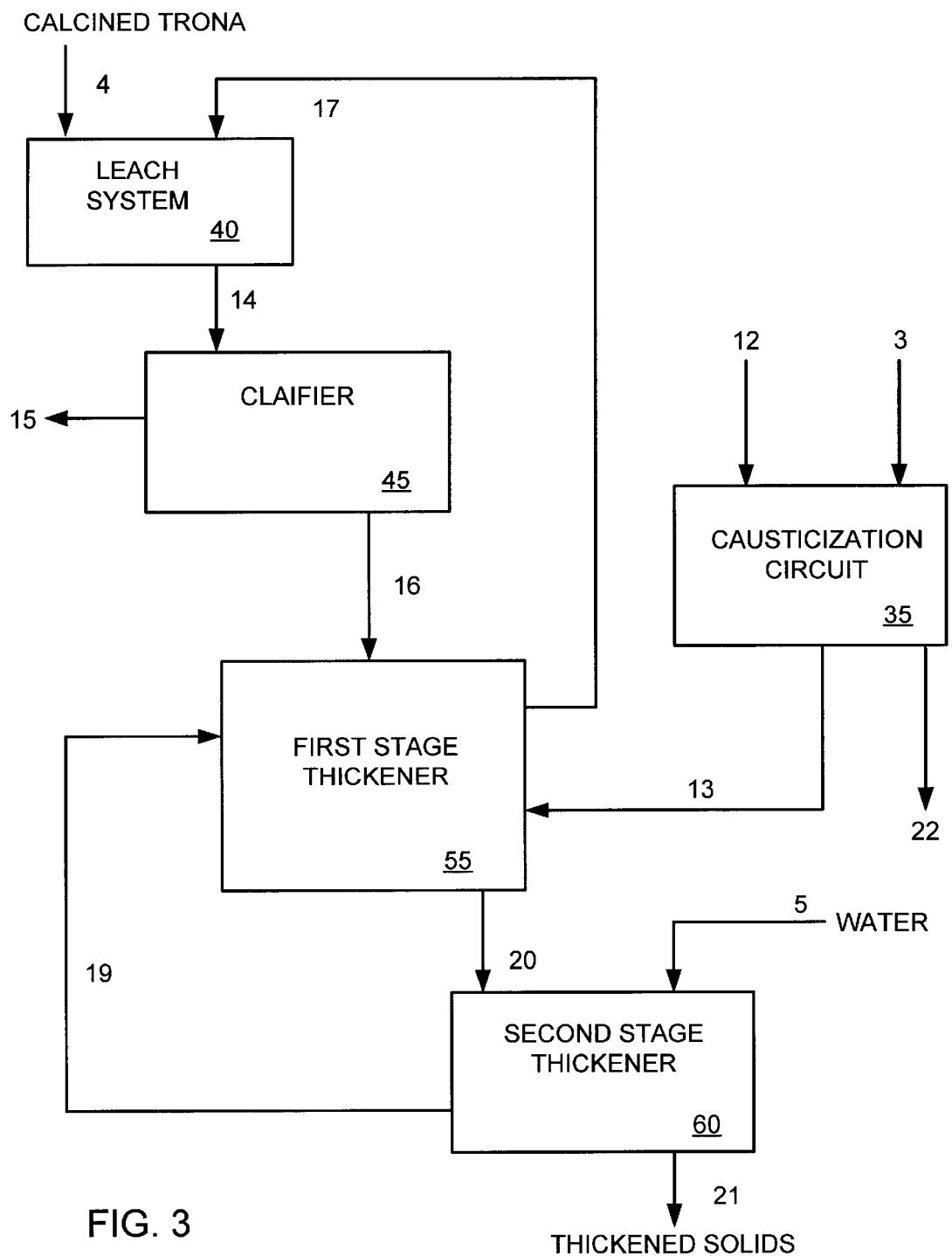
FIG. 3 is a schematic block diagram of one embodiment of the instant invention.

With reference to FIG. 3, the following description is given as an example of the process of the present invention: A feed brine 12 containing 4% by weight sodium bicarbonate and 15% by weight sodium carbonate and minor amounts of sodium chloride and sodium sulfate is heated to 110 degrees C. in a shell and tube heat exchanger. The brine may be fed to a packed bed stripping column and stripped with steam if stripping is desired. If stripping is used, approximately 30% of the sodium bicarbonate present in the feed brine is decomposed in the stripper. Lime 3 containing 95% active CaO is added to the liquor, whether the feed brine or stripped feed brine, in slaker and causticization tanks (causticization circuit 35) to reduce the sodium bicarbonate concentration of the liquor to 0.1% by weight sodium bicarbonate. Grits are separated in the slaker and removed from the process via stream 22. The neutralized brine containing lime muds without grits (stream 13) is added to first stage thickener 55 in a calcined trona dissolving/tailings separation circuit. The overflow liquor 17 from the first stage thickener goes to the calcined trona leach system 40, and the underflow slurry 20 containing lime muds and tailings goes to a second stage of thickening 60. Calcined trona 4 containing little or no sodium bicarbonate is added to the leach system 40. Water 5 is added to the second thickener 60. The overflow liquor 19 from the second stage thickener 60 goes to the first stage thickener 55 along with the neutralized brine 13 and clarifier underflow 16. The amount of water 5 added to the second stage thickener 60 and the amount of calcined trona 4 going to the leach system 40 are regulated to give 30% by weight sodium carbonate in the clarifier overflow liquor 15. The underflow slurry 21 from second stage thickener 60 is disposed of by pumping the tailings and lime muds underground into mined out areas of a trona mine. The overflow liquor 15 from the clarifier 45 is filtered in a pressure leaf filter to remove suspended solids. The filtrate is sent to a mechanical vapor recompression evaporator operating at a temperature of 103 degrees C. where evaporation of water results in precipitation of sodium carbonate monohydrate crystals. The crystals are separated from their mother liquor in a solid bowl centrifuge. The separated crystals are then heated in a fluid bed calciner operating at a temperature of 150 degrees C. to produce dense soda ash. Mother liquor from the centrifuge is recycled back to the evaporator feed tank. A small amount of mother liquor is purged to control impurity build-up in the mother liquor. The mother liquor purge is cooled in a crystallizer to a temperature of 22 degrees C. to precipitate sodium carbonate decahydrate. The sodium carbonate decahydrate crystals are separated from their mother liquor in a centrifuge, and melted and dissolved in hot water to form a 30% by weight sodium carbonate liquor that is recycled back to the sodium carbonate monohydrate evaporator-crystallizer. The centrate from sodium carbonate decahydrate crystallizer is purged from the process.

In order to simplify the description, FIG. 3 does not include such streams as centrifuge wash water, defoamer, crystal growth modifiers, flocculants or other additives or processing aids. Also, to achieve an optimum energy, temperature, and enthalpy balance would require additional heat exchange equipment and consideration of the effect of impurities, which have not been included since they are within the knowledge of those skilled in the art.

While many modifications of the process have been described, other modifications may be made in the principle process to optimize the results, continuous or batch operations, and other changes may be used, without departing from the spirit of the invention or scope thereof.

Having thus described certain preferred embodiments of the present invention, it is to be understood that the invention defined by the appended claims is not to be limited by particular details set forth in the above description, as many apparent variations thereof are possible without departing from the spirit or scope thereof as hereinafter claimed.

What is claimed is:

1. A process for producing a feed liquor for a sodium carbonate monohydrate crystallizer from solutions containing sodium carbonate and sodium bicarbonate comprising:
    dissolving a sodium bicarbonate containing ore in a solution to form a brine;
    neutralizing said brine;
    dissolving calcined trona in said neutralized brine to form a feed liquor; and
    introducing said feed liquor to a sodium carbonate monohydrate crystallizer.

2. The process of claim 1, wherein said sodium bicarbonate containing ore is trona ore.

3. The process of claim 1, wherein said feed liquor comprises a sodium carbonate concentration between about 22 weight percent and about 30 weight percent.

4. The process of claim 1, wherein said feed liquor is adapted to crystallize sodium carbonate.

5. The process of claim 1, wherein said feed liquor comprises a composition from which substantially pure sodium carbonate monohydrate is the first crystallized species to precipitate upon said feed liquor being subjected to crystallization conditions.

6. The process of claim 2, wherein said trona is present in an underground deposit.

7. The process of claim 1, wherein said brine comprises a sodium carbonate concentration between about 13 weight percent and about 17 weight percent.

8. The process of claim 1, wherein said brine comprises a sodium bicarbonate concentration between about 3½ weight percent and about 4.7 weight percent.

9. The process of claim 1, wherein said brine comprises a sodium carbonate concentration between about 10 weight percent and about 17 weight percent and a sodium bicarbonate concentration between about 3 ½ weight percent and about 4.7 weight percent.

10. The process of claim 1, wherein said brine comprises a total alkali value of at least about 8 percent by weight.

11. The process of claim 1, wherein said brine comprises a total alkali value of at least about 3 percent by weight.

12. The process of claim 1, further comprising steam stripping the brine before or after neutralizing the brine.

13. A process of producing sodium carbonate based crystals, comprising:
    dissolving a sodium bicarbonate containing ore in a solution to form a brine;
    adding lime to said brine to form a neutralized brine and lime muds;
    adding said neutralized brine and said lime muds to a thickener, where said neutralized brine is substantially separated from said lime muds:
    recovering said neutralized brine from said thickener;
    dissolving calcined trona in said neutralized brine to form a feed liquor; clarifying said feed liquor; and
    introducing said feed liquor to a crystallizer for crystallizing sodium carbonate based crystals.

14. The process of claim 13, wherein said sodium bicarbonate containing ore is trona.

15. The process of claim 13, wherein said crystallizer is a sodium carbonate monohydrate crystallizer.

16. The process of claim 13, further comprising steam stripping the brine.

17. A process for producing sodium based chemicals from solutions containing sodium carbonate and sodium bicarbonate, comprising:
    dissolving a sodium bicarbonate containing ore in a solution to form a brine having a total alkali value of at least about 8 percent by weight;
    neutralizing, at least a portion of said brine with a caustic to form a neutralized brine having a sodium bicarbonate concentration of about 0 percent by weight to about 2 percent by weight;
    dissolving calcined trona in said neutralized brine to form a feed liquor having, a sodium carbonate concentration between at least 22 percent by weight and about 30 percent by weight;
    crystallizing sodium carbonate monohydrate crystals from the feed liquor.

18. The process of claim 17, wherein neutralizing at least a portion of said brine with a caustic, further comprises:

splitting said brine into a first brine stream and a second brine stream;

adding a sufficient amount of caustic to said first brine stream to form a dilute caustic soda stream having between about 1 percent by weight to about 12 percent by weight sodium hydroxide; and combining said dilute caustic soda stream and said second brine stream to form a neutralized brine having a sodium bicarbonate concentration of about 0 percent by weight to about 2 percent by weight.

19. The process of claim 17, further comprising subjecting said brine to steam stripping to decompose a portion of sodium bicarbonate to sodium carbonate in said brine prior to said neutralizing at least a portion of said brine.

20. A process of producing sodium based chemicals from solution containing sodium carbonate and sodium bicarbonate comprising:

dissolving a sodium bicarbonate containing ore in a solution to form a brine;

splitting said brine into a first stream and a second stream;

causticizing said first stream;

combining said causticized first stream and said second stream to form a neutralized brine stream;

dissolving calcined trona in said neutralized brine stream to form a feed liquor; and crystallizing said feed liquor to precipitate sodium carbonate based crystals.

21. The process of claim 20, wherein said causticizing said first stream is accomplished with lime.

22. The process of claim 20, further comprising steam stripping said brine before splitting said brine into a first stream and a second stream.

23. The process of claim 20, wherein crystallizing said feed liquor to precipitate sodium carbonate based crystals comprises crystallizing the feed liquor in a sodium carbonate monohydrate crystallizer.

24. The process of claim 20, wherein said sodium carbonate based crystals comprise substantially pure sodium carbonate monohydrate crystals.

25. The process of claim 20, wherein said sodium bicarbonate containing ore is trona.

* * * * *